US009602301B2

(12) United States Patent
Averitt

(10) Patent No.: US 9,602,301 B2
(45) Date of Patent: Mar. 21, 2017

(54) SYSTEM AND METHOD FOR COMMISSIONING WIRELESS BUILDING SYSTEM DEVICES

(71) Applicant: Robert Bosch GmbH, Stuttgart (DE)

(72) Inventor: Scott M. Averitt, Roseville, MI (US)

(73) Assignee: Robert Bosch GmbH, Stuttgart (DE)

( * ) Notice: Subject to any disclaimer, the term of this patent is extended or adjusted under 35 U.S.C. 154(b) by 381 days.

(21) Appl. No.: 14/179,821

(22) Filed: Feb. 13, 2014

(65) Prior Publication Data
US 2015/0229488 A1    Aug. 13, 2015

(51) Int. Cl.
| | |
|---|---|
| H04L 12/28 | (2006.01) |
| G05D 23/19 | (2006.01) |
| H04L 29/08 | (2006.01) |
| G05B 15/02 | (2006.01) |
| H04M 1/725 | (2006.01) |

(Continued)

(52) U.S. Cl.
CPC .......... *H04L 12/2809* (2013.01); *G05B 15/02* (2013.01); *G05D 23/1917* (2013.01); *H04L 41/0806* (2013.01); *H04L 67/125* (2013.01); *H04M 1/72533* (2013.01);

(Continued)

(58) Field of Classification Search
CPC ..... E03D 7/00; E04B 1/34869; E04H 1/1216; G05B 15/02; G05D 23/1917; H04L 12/2809; H04L 2012/2841; H04L 2012/285; H04L 41/0806; H04L 67/125; H04M 1/72533; H04W 4/043
See application file for complete search history.

(56) References Cited

U.S. PATENT DOCUMENTS

2008/0151767 A1* 6/2008 Moran ................ H04L 41/0253
370/252
2008/0201112 A1* 8/2008 Bouchard ............... G06F 17/50
703/1

(Continued)

FOREIGN PATENT DOCUMENTS

WO    2009128001    10/2009

OTHER PUBLICATIONS

European Search Report for European Application No. 15154385.7 dated Jun. 8, 2015 (6 pages).

(Continued)

*Primary Examiner* — Yong Hang Jiang
(74) *Attorney, Agent, or Firm* — Michael Best & Friedrich LLP

(57) ABSTRACT

A building commissioning system includes a controller and an electronic database for storing a building layout that includes desired locations for devices to be mounted in a building. The system includes a portable wireless unit with a display for use by an installer. The display on the portable wireless unit shows a graphical representation of the building layout for an area selected by an installer to illustrate desired locations for devices, such as lighting fixtures and wall switches, to be installed in the building. Upon installing a device at the desired location, an installer obtains a unique identifier for the installed device that is matched with the corresponding installed location. The unique identifier and the installed location are sent to the controller for storage in the electronic database. The stored device and location information enable a user to control or adjust device operations.

20 Claims, 5 Drawing Sheets

(51) Int. Cl.
H04W 4/04 (2009.01)
H04L 12/24 (2006.01)
(52) U.S. Cl.
CPC ....... *H04W 4/043* (2013.01); *H04L 2012/285* (2013.01); *H04L 2012/2841* (2013.01)

(56) References Cited

U.S. PATENT DOCUMENTS

| | | |
|---|---|---|
| 2011/0107248 A1 | 5/2011 | Blum et al. |
| 2012/0312874 A1* | 12/2012 | Jonsson .............. G06Q 10/087 235/385 |
| 2014/0015667 A1 | 1/2014 | Kolb |

OTHER PUBLICATIONS

Helios Lighting System, Overview, IHMAN (2013), Retrieved from Internet <URL: http://www.helioslumen.com/en/sistema/>.
Sunset Smart the intelligent street lighting, M-Natura Land LTD (2012), Retrieved from Internet <URL: http://naturaland.hu/en/index.php/termekek/szoftver>.

\* cited by examiner

SYSTEM AND METHOD FOR COMMISSIONING WIRELESS BUILDING SYSTEM DEVICES

BACKGROUND

The present invention relates to a system and method for commissioning wired and/or wireless building system devices installed in a building for control by a building operating system.

Many new construction and building renovation projects today are installing smart lighting systems in order to intelligently control the lighting schemes of a building. Two of many reasons for this approach are to improve energy utilization and to meet new green building standards. Both wireless and wired devices and systems exist on the market today and although both have advantages and disadvantages over each other, they both share one common issue. In order for a control system to intelligently control a lighting system, the configuration of the building layout and desired operation must be determined. This requires installers to ensure that the system will operate properly when completed and that the user be informed regarding which light devices are connected for control and the specific locations in the building for the light devices. For wireless systems, the installer must note the address of each light device so that the address can be programmed into the controller. Using the address information, the controller determines whether other control devices can control the light devices. These requirements not only complicate the install process, but also limit and/or hinder the ability of a facilities manager to make changes and/or additions to the system at a later date.

SUMMARY

In one embodiment, the invention provides a method for installing devices in buildings with a building commissioning system including a controller and an electronic database for storing a building layout that includes desired locations for devices to be mounted in a building, along with a portable wireless unit with a display for use by an installer. The method includes the steps of displaying with the portable wireless unit a graphical representation of the building layout for an area selected by an installer to illustrate a desired location for a device to be installed in the building and obtaining a unique identifier for the device that is installed at the desired location. The unique identifier is then sent to the controller and stored in the database.

In another embodiment, the invention comprises a building commissioning system for installing and operating devices in buildings that includes a controller and an electronic database for storing a building layout that includes desired locations for devices to be mounted in a building. A portable wireless unit including a device reader and a display selectively displays a graphical representation of a portion of the building layout at an area selected by an installer to map a desired location for a device to be installed in the building. The portable wireless unit obtains a unique identifier for the device that is installed in the desired location, matches the unique identifier with the corresponding desired location, and sends the unique identifier and the corresponding location to the controller for storage in the electronic database.

In another embodiment, the invention installs or rearranges devices in buildings by providing a building commissioning system that includes an electronic database for storing a building layout that includes desired locations for devices to be mounted in a building and providing a portable wireless unit with a display for use by an installer of devices. The portable wireless unit displays a graphical floor representation of a floor of the building layout selected by an installer to assist in finding a room location for a device to be installed. An installer then selects a room location and the portable wireless unit displays a graphical representation of the building layout for a selected room area to illustrate a desired location for a device to be installed in the selected room area. The portable wireless unit is operated to obtain a unique identifier for the device that is installed at the desired location in the selected room area, and the unique identifier is matched with the corresponding installed location.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Among other things, embodiments of the invention provide location information for devices to an installer within a building to show locations for devices to be installed. Further, information regarding the installed devices and the corresponding device locations is sent to an electronic database so that a user may remotely control the installed devices upon installation thereof.

Figure 1:
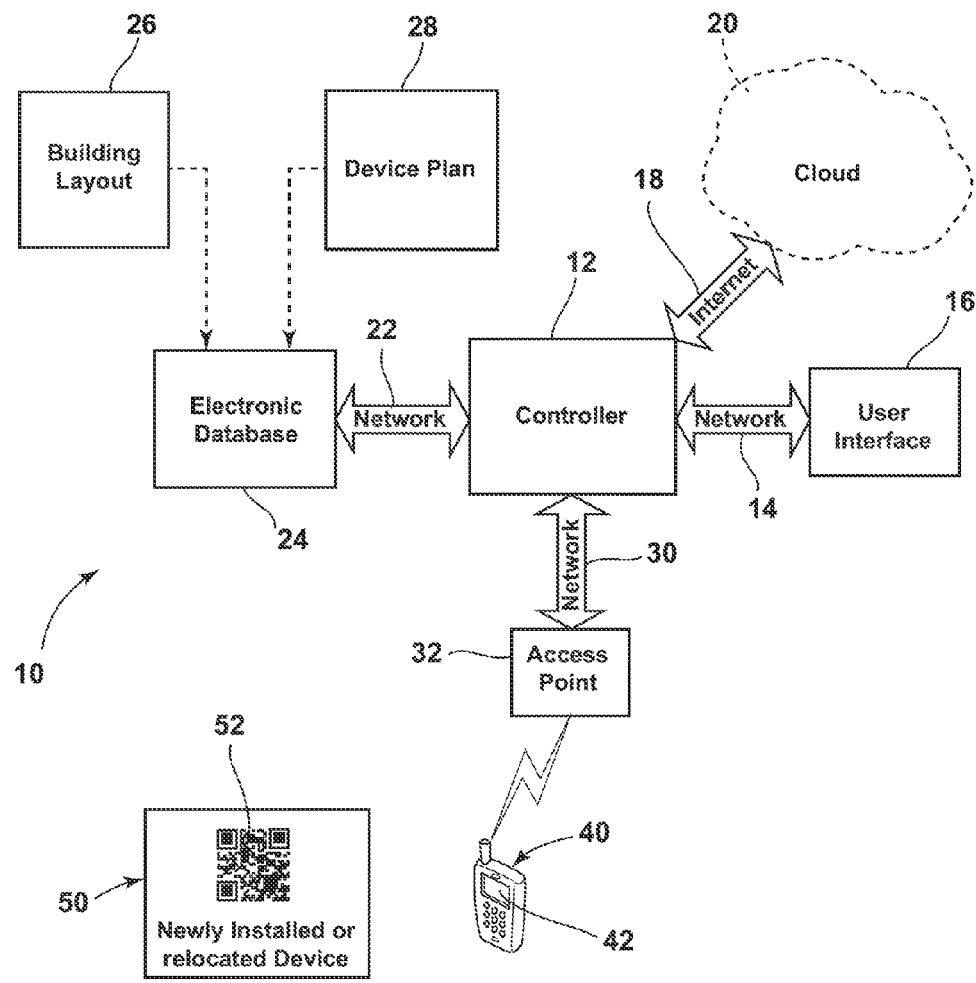
FIG. 1 shows a first embodiment of a building commissioning system including an electronic database and a portable wireless unit with a display.

FIG. 1 shows a building commissioning system 10 including a controller or processor 12 that is connected over a network 14 to a user-interface device 16 and via the Internet 18, to a cloud 20 that can include a cloud-based server system. Further, the controller 12 is connected via a network 22 to an electronic database 24 that stores a building layout 26 for a new building or a building to be renovated and a corresponding device plan 28 for the building. FIG. 1 also shows a network 30 connecting the controller 12 to a communication access point or link 32. A portable wireless unit 40 having a display 42 communicates with the controller 12 via the access point 32 and network 30. A newly installed device 50 illustrated in FIG. 1 has a unique identifier 52 with a unique data matrix code provided thereon for reading by a camera (not shown) of the portable wireless unit 40.

The controller 12 typically is disposed at a building site. The networks 14, 22, 30 typically are formed as a single network with plural elements configured to communicate thereon.

The user interface device 16 includes one or more of a keypad, touchscreen, mouse, usb port and other components that enable a user (e.g., a building planner or lighting layout architect) to provide building layouts 26 and corresponding device plans 28 to the controller 12 and, ultimately, for storage in the electronic database 24. The building layouts 26 include maps for rooms on multiple floors of a building. Further, exact locations for the devices 50 to be installed within each room are provided for storage in the electronic database 24. Thus, the electronic database 24 includes all of the information required for new construction or renovation of a building.

Figure 2:
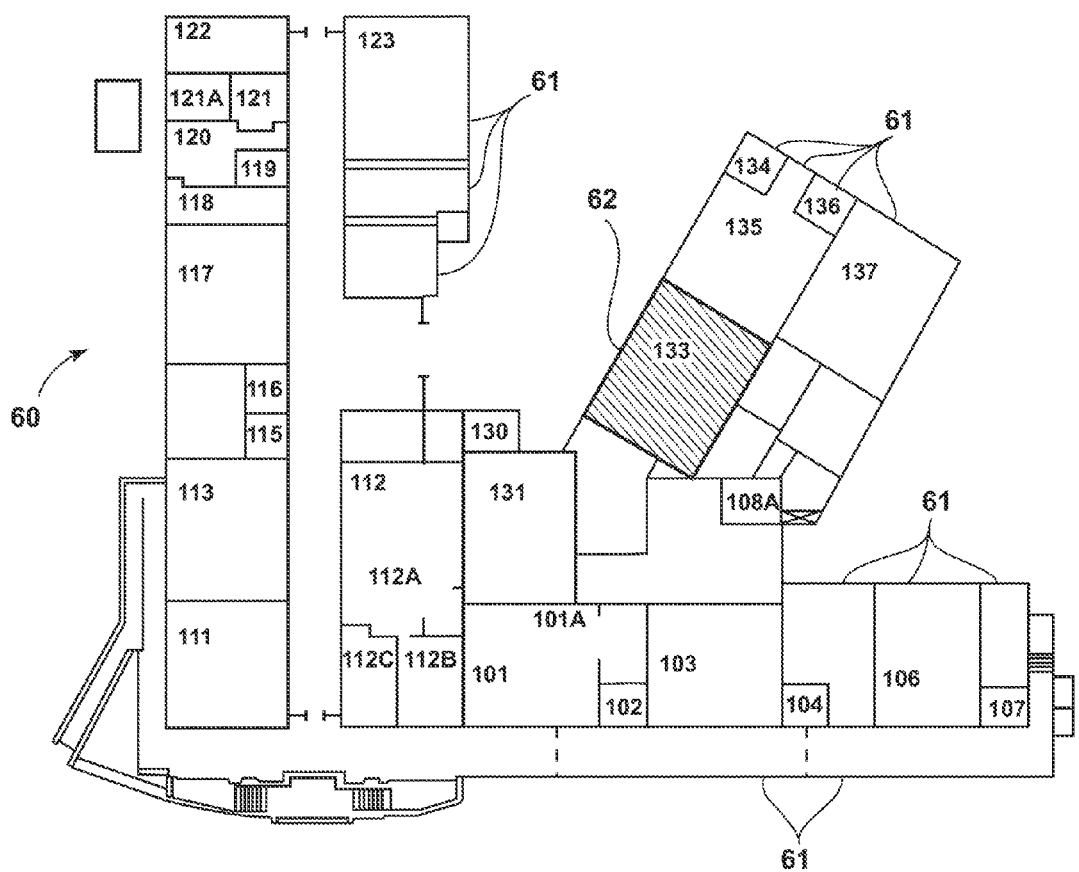
FIG. 2 shows a graphical representation for displaying on a portable wireless unit to show locations of rooms on a building floor for devices to be installed.
Figure 3:
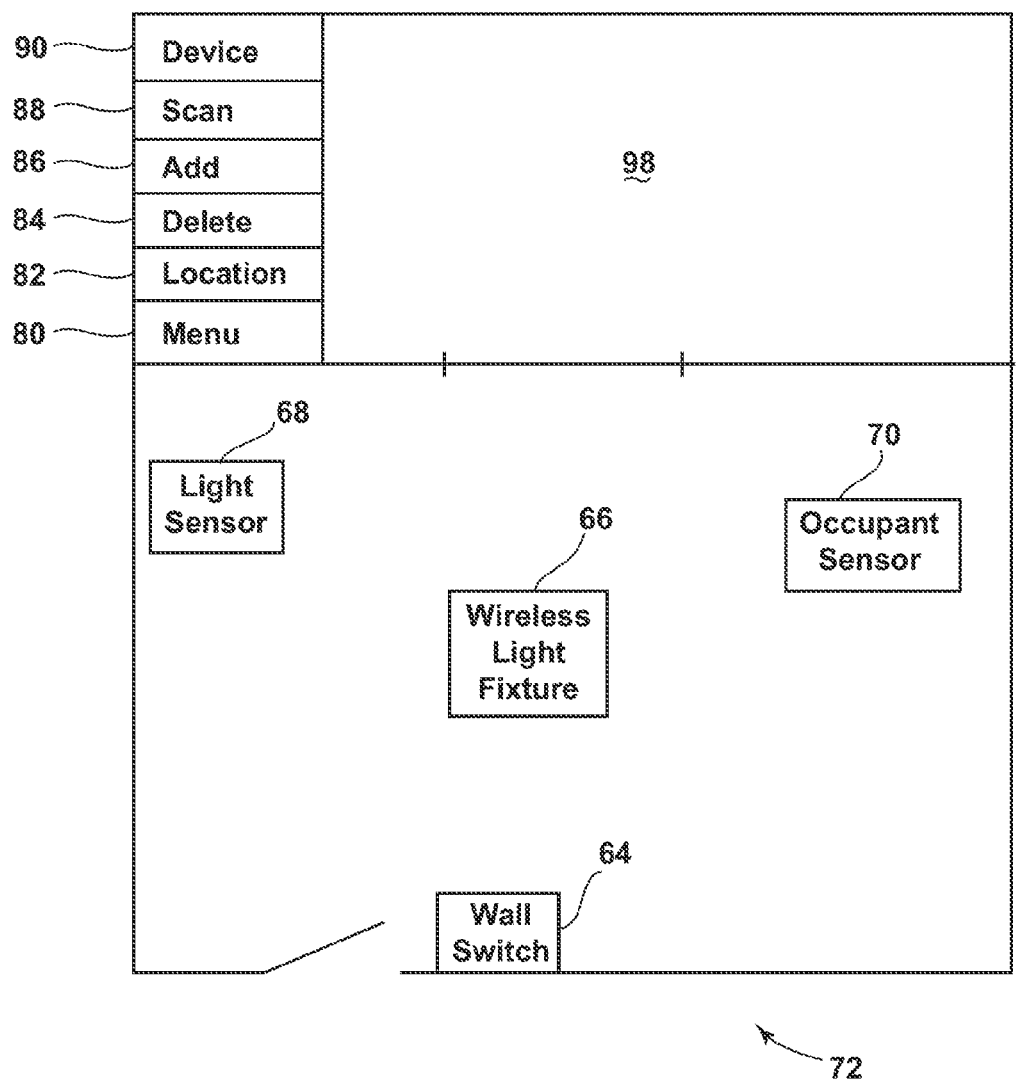
FIG. 3 shows a graphical representation for display on the portable wireless unit of locations for devices to be installed within a selected room.

FIG. 2 shows a graphical representation of an exemplary floor 60 of a building. The floor 60 includes a number of halls and rooms 61 (represented graphically), including a highlighted or selected room 62. The floor 60 is presented for viewing on the display 42 of the portable wireless unit 40. As shown in FIG. 2, the room 62 is highlighted by an installer using a touchscreen, cursor-control or similar input device of the portable wireless unit 40. The installer selects room 62, and the graphical representation of the room is displayed without other rooms 61 of the floor 60 as shown in FIG. 3. As displayed in FIG. 3, the room 62 includes labeled locations for the devices to be installed. A plurality of devices 50 are illustrated at specific areas of or locations within the room 62. A graphical representation of a wireless wall switch 64 is illustrated adjacent a door to the room 62 and a wireless light fixture graphical representation 66 is illustrated in the center of the room 62. Further, graphical representations of an ambient light sensor 68 and an occupant sensor 70 are shown. Other devices that could be installed in the room and graphically represented on the display include motion sensors and temperature sensors. As shown in FIG. 3, the graphical representation 72 on the display 42 also includes selection commands for a menu 80, location 82, delete 84, add 86, scan 88 and device 90. Region 98 of the graphical representation displays appropriate text, such as device characteristics or exact location information.

In operation, an installer with a portable wireless unit 40 is on a specific floor within a building with a plurality of devices 50 to be installed. The installer selects the specific floor to obtain information and the portable wireless unit 40 sends a request to the controller 12 via the access point 32 asking for the floor plan. The controller obtains the plan from the electronic database 24 and wirelessly sends the floor plan to the portable wireless unit 40. The wireless unit 40 provides the selected building floor graphical representation 60 on the display 42. The installer then selects a nearby room and the wireless unit 40 sends a request to the controller 12, which returns the room graphical representation 62 shown in FIG. 3 for the display 42. The installer notes a mounting location within the room for a wireless wall switch 64 and mounts the wall switch thereat. Thereafter, or before mounting the wireless wall switch 64, with the portable wireless unit 40 the installer uses the SCAN command to obtain the data matrix code of the unique identifier 52 from the wall switch. The unique identifier 52 for the wireless wall switch includes a unique communication address, a device type/model number and a device function that are displayed in region 98 of the graphical representation of room 62 in FIG. 3. Thereafter, the installer selects the ADD command and the unique identifier and the installed location of the wireless wall switch are sent by the portable wireless unit 40 to the electronic database 24 via the controller 12. The installed location and the unique identifier for the wireless wall switch 64 are stored in the electronic database 24 indicating the unique wall switch provided at the specific location.

In addition to installing devices in a newly constructed building, another embodiment of the invention includes replacing a previously installed device 50 with a similar or upgraded version of the device. For example, a facilities manager decides to substitute wireless light emitting diode (LED) light fixtures for incandescent light fixtures. To do so, the incandescent light fixtures for a building are found in the electronic database 24 and flagged for replacement. An installer finds a desired location for an incandescent light fixture to be replaced in the same manner as described above for a new construction. An installer selects SCAN and the portable wireless unit 40 reads the unique identifier for the incandescent light fixture to be removed. The installer selects DELETE and sends the unique identifier and the specific location to the electronic database 24 via the controller 12 to delete the unique device identifier for the specific location. The installer then selects a device SCAN command with the portable wireless unit 40 and reads the unique identifier for the LED light fixture to be installed and mounts the LED light fixture. The installer then selects the ADD command and the portable wireless unit 40 sends the unique identifier for the LED light fixture to the electronic database 24 for storage therein corresponding to the same location as the removed incandescent light fixture. In a similar manner, the installer mounts the removed incandescent light fixture at another desired location and communicates the unique identifier to the electronic database 24.

Figure 4:
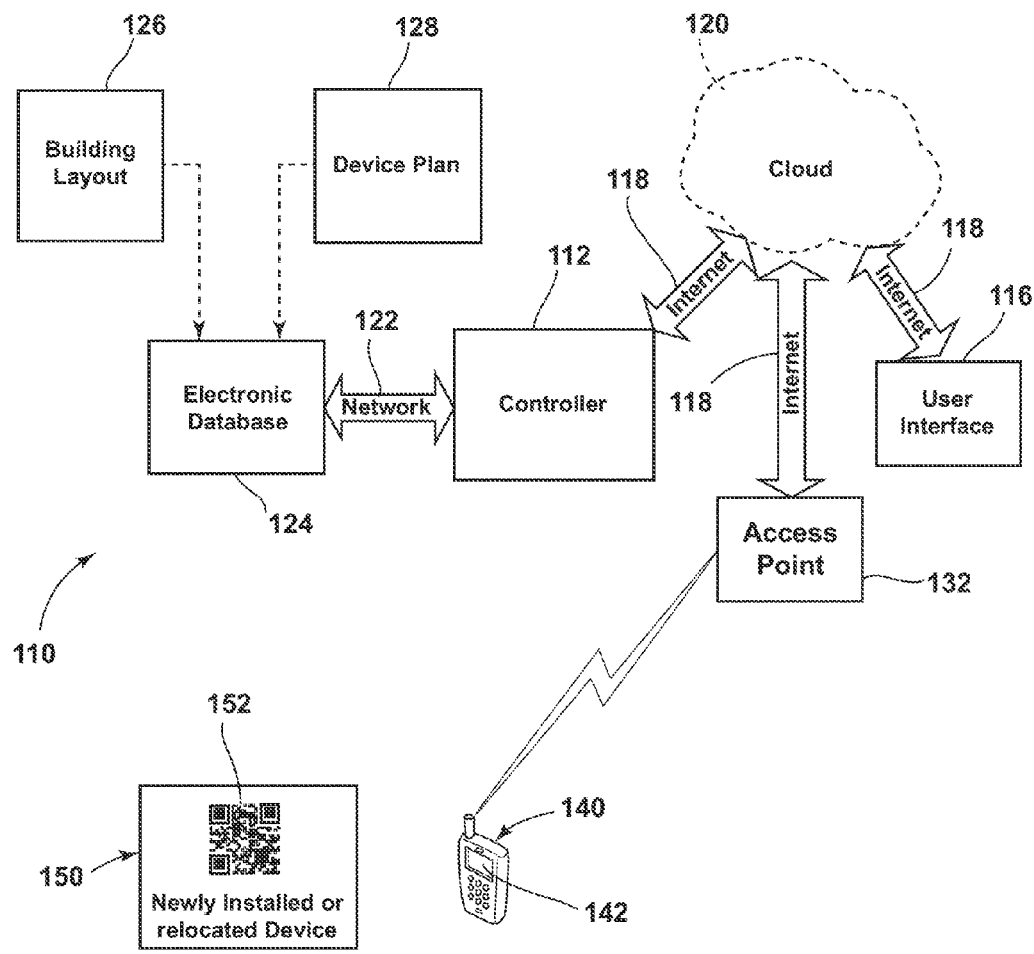
FIG. 4 shows a second embodiment of a building commissioning system including an electronic database and a portable wireless unit with a display.

FIG. 4 shows another embodiment of the building commissioning system similar in operation to the system shown. In particular, FIG. 4 illustrates a building commissioning system 110 including a processor or controller 112 that is connected over the Internet 118 and cloud 120. The controller 112 is also connected to remote resources representing the cloud 120 to a user interface 116. In some embodiments, the cloud 120 includes a cloud-based server system or cloud-computing arrangement. Further, the controller 112 connects via a network 122 to an electronic database 124 that stores a building layout 126 for a new building or a building to be renovated and a corresponding device plan 128 for the building. FIG. 4 also shows the link 118 connecting the controller 112 to a communication access point or link 132. A portable wireless unit 140 having a display 142 communicates with the controller 112 via the access point 132 and link 118. A newly installed device 150 illustrated in FIG. 1 has a unique data matrix code 152 provided thereon for reading by a camera (not shown) of the portable wireless unit 140.

In operation, the FIG. 4 embodiment functionally operates in a manner that is similar to the FIG. 1 embodiment. In FIG. 4, however, the portable wireless unit 140 is a cellular phone or tablet, and the access point 132 is a cellular tower or similar connection point. In operation, the unique identifier and the corresponding location are stored in the smartphone and both are uploaded in real time. In other embodiments, the unique identifier and the corresponding installed location are uploaded upon completion of a plurality of installations. In some embodiments, the controller 112 is a software program on a cloud-based remote server. Likewise, the electronic database 124 is stored in the memory of a cloud-based remote server in some embodiments.

Figure 5:
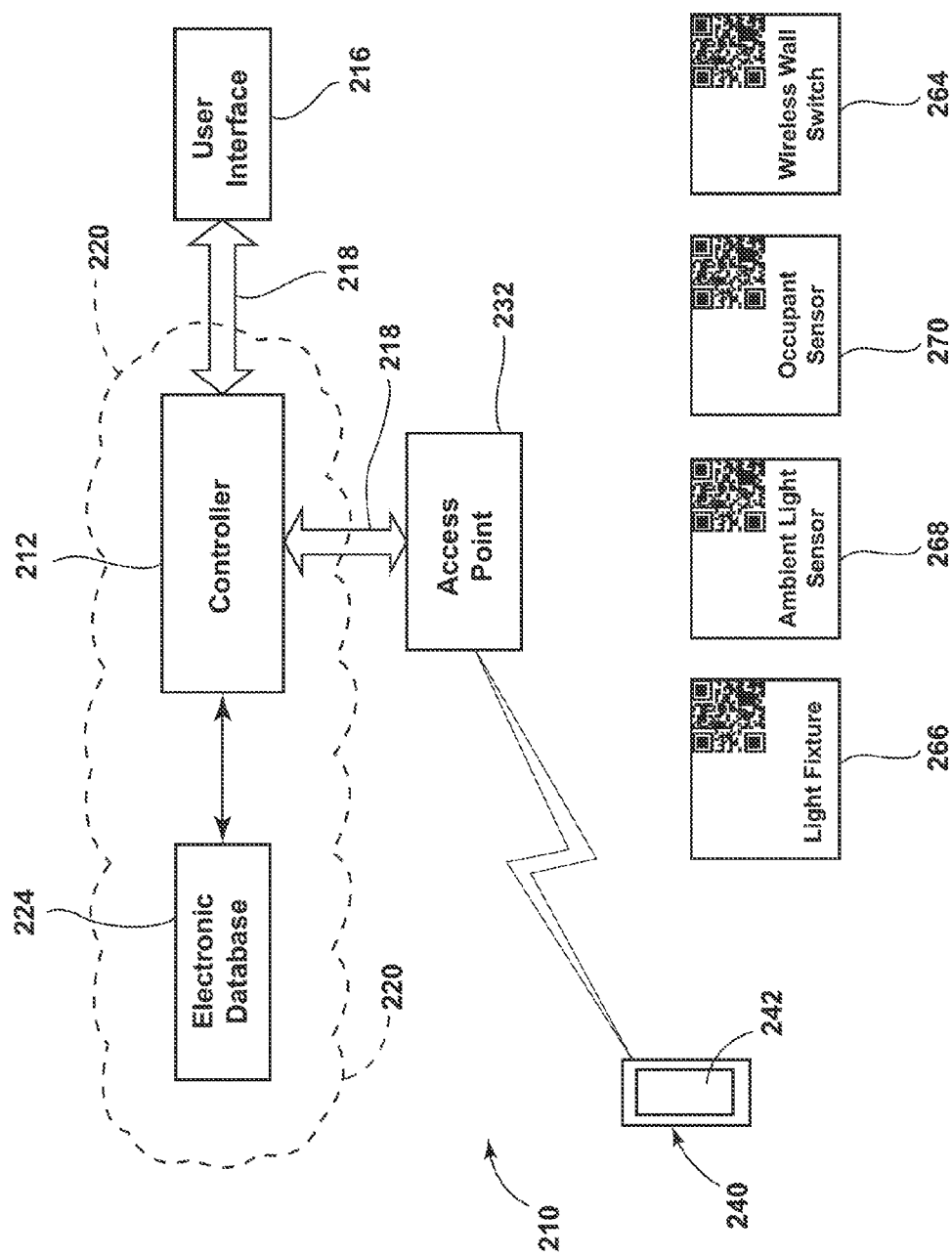
FIG. 5 shows a block diagram of a building operating system that includes a plurality of installed devices.

FIG. 5 illustrates a wireless building control system 210 for control of a plurality of devices including a controller 212 that is connected over the Internet, other network, or link 218 to a user interface 216. Further, the controller 212 is connected to an electronic database 224 that stores a building layout for a new building or a building to be renovated and a corresponding device plan for the building. The controller 212 and electronic database 224 are a cloud-based system provided on cloud 220 and, thus, are located on one or more cloud-based servers at a remote location. FIG. 5 also shows the link 218 connecting the controller 212 to a communication access point 232. A cellular telephone 240 having a display 242 communicates with the controller 212 via the access point 232 and link 218. Newly installed wireless wall switch 264, wireless light fixture 266, ambient light sensor 268 and occupant sensor 270 are all devices that communicate wirelessly with the controller 212 via access point 232 or a different local access point to provide information to, and receive instructions from the controller.

In operation, for example, the ambient light sensor 268 sends the sensed light level to the controller 212. The controller 212 determines the necessity for light output from the wireless light fixture 266 and controls same. Actuating wireless wall switch 264 sends a signal that overrides the controller and controls the wireless light fixture 266.

In the building control system 210 shown in FIG. 5, with the device information and locations stored in the electronic database 224, the controller 212 controls any of the devices 50 as desired based on the devices functionalities and the desire of a user providing inputs to make changes and/or updates to the system at the user interface 216.

In other embodiments, the devices include a heating, ventilation, and air conditioning (HVAC) system having a temperature sensor, a powered vent controller for closing and opening a vent, a ceiling fan and powered window shades/shutters. In other embodiments, the devices include a security system with motion detectors, a speaker system capable of providing warning messages as well as music, and industrial controls. Some of the devices 50 are smart devices that communicate with the controller 12. Other devices 50 in the wireless building commissioning system 10 only react to commands from the controller 12. In some embodiments, wired devices 50 communicate with the controller 12. The wired devices 50 operate via a communication address, but through a wired medium instead of wirelessly. In one embodiment, the wired medium is a dedicated communication wiring. In another embodiment, the wired medium is a PLC or power line communication, wherein devices communicate over the power line. The arrangement extends to a subsystem with a secondary local controller that communicates with a whole building controller.

The FIG. 1 embodiment shows the device 50 having a unique identifier 52 with a data matrix code displayed thereon that is read by an optical scanner or camera provided with the portable wireless unit 40. The identifier 52 having a code is affixed to the individual devices by a manufacturer, or identifiers are printed and affixed to the devices in batches prior to the installation process. In other embodiments, the unique identifiers 52 are secured to the devices 50 before the devices are delivered to the building. In other embodiments, the code is a barcode. In further embodiments, the code is provided within a radio frequency identification (RFID) chip and the portable wireless device 40 includes a RFID reader. In another embodiment, a near field communication (NFC) device of a smartphone or tablet obtains the unique identifier 52 of the device 50.

In various embodiments, the access point or link is a WiFi network link, a cellular phone network with a network tower link, a local area network (LAN) link, wide area network (WAN) link, and other known communication links.

The portable wireless units 40 comprise cellular telephones, tablets and smartphones. Another portable wireless unit includes a laptop computer. Other portable wireless units, such as a universal remote control, are contemplated.

In many embodiments, a preliminary step includes storing desired selected locations within the building layout in the electronic database for devices to be installed in the building during the design of a new building or a building renovation.

Thus, the invention provides, among other things, a system and method that enables an installer to record device data and device location within a building for installed wireless smart devices. Thus, a facilities manager has a map of the locations of the devices for adjusting the operation of the lighting system and other systems from a remote location. Various features and advantages of the invention are set forth in the following claims.

What is claimed is:

1. A method for installing and rearranging devices in buildings, the method comprising the steps of:
   providing a building commissioning system including a controller and an electronic database for storing a building layout that includes desired locations for devices to be installed in a building;
   providing a portable wireless unit with a display for use by an installer;
   displaying with the portable wireless unit a graphical representation of the building layout for an area selected by an installer to illustrate at least a first desired location of the desired locations for at least a first device of the devices to be installed in the building;
   installing the first device at the first desired location;
   with the portable wireless unit, reading a unique identifier from the first device that is installed at the first desired location, wherein the identifier is matched with the corresponding first desired location;
   providing the unique identifier matched with the first desired location from the portable wireless unit to the controller for storage in the electronic database;
   reading the unique identifier for an installed device to be deleted; and
   selecting a device delete command with the display of the portable wireless unit to provide deleted device information and the location for the installed device to be deleted to the electronic database,
   wherein removing the installed device to be deleted results in a deleted device.

2. The method of claim 1, wherein the step of providing the identifier matched with the first desired location to the electronic database comprises storing the identifier and the corresponding first desired location in the portable wireless unit and uploading the identifier in real time, wherein the portable wireless unit comprises a smartphone connected to the building commissioning system via at least one selected from a group consisting of a cellular phone network and a WiFi network.

3. The method of claim 2, wherein the building commissioning system comprises a cloud computing arrangement, and the first device comprises a wired device.

4. The method of claim 1, wherein the step of reading the identifier for the first device comprises reading a data code that is affixed to the first device with the portable wireless unit.

5. The method of claim 1, including a preliminary step of storing locations within the building layout in the electronic database for the devices to be installed in the building during the design of a new building or a building renovation.

6. The method of claim 1, wherein the devices comprise at least one selected from a group consisting of light fixtures, ambient light sensors, occupant sensors, motion sensors, temperature sensors and wireless wall-mounted switches.

7. The method of claim 1, wherein the devices comprise at least one selected from a group consisting of a HVAC system, a security system, a speaker system and industrial controls.

8. The method of claim 7, including the step of: securing unique identifiers to the devices before the devices are delivered to the building.

9. The method of claim 7, wherein the step of providing the unique identifier matched with the first desired location comprises storing the unique identifier and the first desired location in the portable wireless unit for uploading upon completion of a plurality of the device installations.

10. The method of claim 1, wherein the unique identifier comprises a communication address, a device type and a device function.

11. The method of claim 1, including the steps of:
removing the installed device to be deleted resulting in the deleted device;
remounting and installing the deleted device at a second different desired location of the desired locations as a remounted installed device;
reading the unique identifier for the remounted installed device at the second different location; and
providing the unique identifier for the remounted installed device and the second different location to the building commissioning system for storage in the electronic database.

12. The method of claim 1, wherein the step of displaying a graphical representation for the area selected by an installer comprises the step of an installer selecting a building floor and a room on the building floor as the graphical representation of the area.

13. A building commissioning system for installing and rearranging devices in buildings, the system comprising:
a controller;
an electronic database for storing a building layout that includes desired locations for the devices to be mounted in a building; and
a portable wireless unit including a device reader and a display for selectively displaying a graphical representation of a portion of the building layout at an area selected by an installer to map at least a first desired location for at least a first device of the devices to be installed in the building, wherein the device reader of the portable wireless unit is configured to read an unique identifier for the first device that is installed in the first desired location, match the unique identifier with the corresponding first desired location, and send the unique identifier and the corresponding first desired location to the controller for storage in the electronic database,
wherein the device reader is configured to read the unique identifier for an installed device to be deleted, and in response to selection of a device delete command with the display of the portable wireless unit, provide deleted device information and the location of the installed device to be deleted to the electronic database, wherein removing the installed device to be deleted results in a deleted device.

14. The building commissioning system of claim 13, wherein the portable wireless unit comprises a smartphone connected to the controller via at least one selected from a group consisting of a cellular phone network and a WiFi network.

15. The building commissioning system of claim 13, wherein the device reader of the portable wireless unit comprises at least one selected from a group consisting of a camera, an optical scanner and an RFID reader.

16. The building commissioning system of claim 13, wherein the first device is selected from a group consisting of light fixtures, ambient light sensors, occupant sensors, motion sensors, wireless wall switches, and temperature sensors.

17. The building commissioning system of claim 13, wherein the first device is selected from a group including a HVAC system, a security system, a sound system and industrial controls.

18. A method for installing or rearranging devices in buildings, the method comprising the steps of:
providing a building commissioning system including an electronic database for storing a building layout that includes desired locations for the devices to be mounted in a building;
providing a portable wireless unit with a display for use by an installer of the devices;
displaying with the portable wireless unit a graphical representation of a floor of the building layout for a floor selected by an installer to assist in finding a room location for a first device of the devices to be installed;
displaying with the portable wireless unit a graphical representation of the building layout for a room area selected by an installer from the floor representation to illustrate at least a first desired location of the desired locations for the first device to be installed in the selected room area
with the portable wireless unit, reading a unique identifier for the first device that is installed at the first desired location in the selected room area, wherein the unique identifier is matched with the first desired location that corresponds to an installed location for the first device;
reading the unique identifier for an installed device to be deleted; and
selecting a device delete command with the display of the portable wireless unit to provide deleted device information and the location for the installed device to be deleted to the electronic database,
wherein removing the installed device to be deleted results in a deleted device.

19. The method of claim 18, including the step of providing the unique identifier matched with the installed location to the building commissioning system for storage in the electronic database.

20. The method of claim 19, wherein the portable wireless unit reads the unique identifier for the first device installed at the installed location by scanning a code on the first device after installation.

* * * * *